United States Patent [19]
Aoki

[11] Patent Number: 5,172,272
[45] Date of Patent: Dec. 15, 1992

[54] IMAGING LENS SYSTEM

[75] Inventor: Norihiko Aoki, Tokyo, Japan

[73] Assignee: Olympus Optical Co., Ltd., Tokyo, Japan

[21] Appl. No.: 633,278

[22] Filed: Dec. 24, 1990

[30] Foreign Application Priority Data

Dec. 25, 1989 [JP] Japan .................................. 1-332840

[51] Int. Cl.$^5$ ........................... G02B 9/14; G02B 9/16; G02B 9/20; G02B 9/36
[52] U.S. Cl. .................... 359/654; 359/775; 359/785
[58] Field of Search .............. 350/475, 476, 413, 450, 350/432–435; 359/654, 775, 785

[56] References Cited

U.S. PATENT DOCUMENTS

| | | | |
|---|---|---|---|
| 4,859,040 | 8/1989 | Kitagishi et al. | 350/413 |
| 4,907,866 | 3/1990 | Kitagishi et al. | 359/654 |
| 4,998,807 | 3/1991 | Uzawa et al. | 350/413 X |

FOREIGN PATENT DOCUMENTS 55-65918 5/1980 Japan .
58-142309 8/1983 Japan .

OTHER PUBLICATIONS

Caldwell, J. B. et al; "Design of Gradient Index Lens Systems for Disc Format Cameras", *Applied Optics*; vol. 25, No. 18; Sep. 1986; pp. 3351–3355.

*Primary Examiner*—Scott J. Sugarman
*Attorney, Agent, or Firm*—Cushman, Darby & Cushman

[57] ABSTRACT

An imaging lens system comprising, in the order from the object side, a first lens component having a convex surface on the object side and a positive refractive power, a second lens component having a concave surface on the image side and a negative refractive power, and a third lens component. Through the imaging lens system is of a triplet or Tessar type, the lens system is designed so as to have a high aperture ratio and favorably corrected coma by arranging a radial GRIN lens element having a concave surface on the image side and a positive refractive power at the most image side location in the third lens component.

17 Claims, 9 Drawing Sheets

IMAGING LENS SYSTEM

BACKGROUND OF THE INVENTION (a) Field of the invention

The present invention relates to an imaging lens system which uses at least one graded refractive index lens element of the so-called radial type having refractive index distribution in the direction perpendicular to the optical axis (radial GRIN lens element).

(b) Description of the prior art

As imaging lens systems consisting of small numbers of lens elements out of the conventional imaging lens systems, there are known triplet type and Tessar type of lens systems. Each of the lens systems of the triplet type or Tessar type consists of three or four lens elements. Speaking more concretely, the imaging lens system of this type is composed of a positive lens element, a negative lens element and a positive lens element, or a positive lens element, a negative lens element, a negative lens element and a positive lens element, and the object side surface of the second lens element having the negative refractive power is generally designed as a concave surface. This concave surface is adopted for correcting negative spherical aberration in the imaging lens system as a whole, but aggravates coma and curvature of sagittal image surface, thereby degrading optical performance of the imaging lens system. Accordingly, this type imaging lens system cannot have a high aperture ratio while correcting aberrations favorably over the entire range of the image surface and is used with lens shutter cameras, but scarcely adopted for use with single-lens reflex cameras for which higher optical performance is desired.

Japanese Patent Kokai Publication No. Sho 55-65918 disclosed a Tessar type imaging lens system which is designed so as to have a high aperture ratio of F/1.7 by using an aspherical surface. In this lens system also, the object side surface of the second lens element is designed as a concave surface and coma is not corrected sufficiently favorably.

Japanese Patent Kokai Publication No. Sho 58-142309 disclosed another imaging lens system of the Tessar type in which the object side surface of the second lens element is designed as a convex surface and coma is corrected favorably. However, this lens system has an aperture ratio of F/2.8 due to insufficiently corrected spherical aberration and cannot be said as a lens system which has a sufficiently high aperture ratio.

Further, Applied Optics Vol. 25, No. 18 showed design examples of lens systems using graded refractive index lens elements. However, this literature clarified no difference between the design examples and lens systems composed only of homogeneous lens elements or made no attempt to enhance the aperture ratio of F/2.8 of the lens systems described therein.

SUMMARY OF THE INVENTION

A primary object of the present invention is to provide an imaging lens system which comprises a very small number of lens elements, and has a high aperture ratio of at least F/2 and favorably corrected aberrations such as coma.

The imaging lens system according to the present invention comprises, in the order from the object side, a first lens component which has a convex surface on the object side and a positive refractive power, a second lens component which has a concave surface on the image side and a negative refractive power, and a third lens component which comprises a radial GRIN lens element having a convex surface on the image side and a positive refractive power. When the third lens component comprises a plurality of lens elements, said radial GRIN lens element is arranged on the most image side in the third lens component.

In a preferred formation of the imaging lens system according to the present invention, the first lens component is composed of a single positive lens element which has a convex surface on the object side, the second lens component is composed of a single negative lens element which has a concave surface on the image side, and the third lens component is composed of a positive lens element having a convex surface on the image side or a negative lens element having a concave surface on the object side and a positive lens element having a convex surface on the image side.

The imaging lens system according to the present invention adopts the radial GRIN lens element, as the positive lens element which produces remarkable spherical aberration due to the strong positive refractive power and arranged at the most image side location, for correcting the spherical aberration, thereby having a high aperture ratio and coma corrected simultaneously with the spherical aberration.

The GRIN lens element used in the imaging lens system according to the present invention is of the so-called radial type which has a refractive index distribution in the direction perpendicular to the optical axis as described above. The refractive index distribution of the radial GRIN lens element is expressed by the following formula:

$$n(r) = N_0 + N_1 r^2 + N_2 r^4 + N_3 r^6 + \ldots$$

wherein the reference symbol $N_0$ represents the refractive index of the GRIN lens element as measured on the optical axis, the reference symbol $r$ designates the distance as measured from the optical axis to a lens portion of interest in the radial direction, the reference symbol $n(r)$ denotes the refractive index of the lens portion located at the distance $r$ from the optical axis, and the reference symbols $N_1, N_2, N_3, \ldots$ represent the refractive index distribution coefficients of the second order, fourth order, sixth order,....

As for the capabilities to correct aberrations, the GRIN lens element is excellent especially in the capability to correct Petzval's sum.

A Petzval's sum of a lens system composed only of homogeneous lens elements is expressed as follows:

$$\Sigma(\phi_s/N_0) \quad (1/mm)$$

wherein the reference symbol $\phi_s$ represents the refractive power of surface and the reference symbol $N_0$ designates the refractive index as measured on the optical axis of the lens element.

Further, the GRIN lens element has a Petzval's sum which is expressed as follows:

$$\phi_s'/N_0 + \phi_M/N_0^2 \quad (1/mm)$$

wherein the reference symbol $\phi_s'$ represents the refractive power of surface and the reference symbol $\phi_M$ designates the refractive power of medium.

The refractive power of surface $\phi_s$ means the refractive power of a lens element which has the same shape as that of the GRIN lens element and a constant internal refractive index of $N_0$, and the refractive power of medium means the refractive power of a cylindrical member which has the same thickness as that of the GRIN lens element as measured on the optical axis, and planar surfaces of incidence and emergence.

As is understood from the formula mentioned above, the graded refractive index lens element has the refractive power of medium and is capable of correcting the Petzval's sum.

A Petzval's sum of an imaging lens system generally has a positive value. When a GRIN lens element is to be used in the imaging lens system, it is therefore effective for correcting the Petzval's sum to impart a positive refractive power to the GRIN lens element.

With regard to the GRIN lens element, the following relationship establishes between the refractive power of medium $\phi_M$ and the coefficient $N_1$ used in the refractive index distribution formula:

$$\phi_M = -2N_1 t$$

wherein the reference symbol t represents the thickness of the GRIN lens element as measured on the optical axis.

In order to obtain a positive refractive power of medium of the GRIN lens element, it is therefore necessary to select $N_1$ within the range defined below:

$$N_1 < 0$$

Furthermore, in an attempt to enhance aperture ratio of a lens system, a problem is posed especially by production of negative spherical aberration.

When an adequate internal refractive power profile is selected for the GRIN lens element, it is capable of correcting spherical aberration by the combination of shape of the surface thereof and the refractive index profile. The imaging lens system according to the present invention is designed so as to correct the Petzval's sum thereof and spherical aberration by adopting the GRIN lens element as the positive lens element arranged on the most image side in the lens system, i.e., the positive lens element which is arranged on the most image side in the third lens component, and designing this GRIN lens element so as to satisfy the following conditions (1) and (2):

$$-7.0 < N_{1(1)} \cdot f^2 < -0.5 \quad (1)$$

$$0.1 < F \cdot t / f < 1.5 \quad (2)$$

wherein the reference symbol $N_{1(1)}$ represents the refractive index distribution coefficient of the second order of the GRIN lens element arranged on the most image side, the reference symbol f designates the focal length of the imaging lens system as a whole, the reference symbol F denotes the F number of the imaging lens system and the reference symbol t represents the thickness of said GRIN lens element as measured on the optical axis.

If the lower limit of the condition (1) is exceeded or the upper limit of the condition (2) is exceeded, the medium of the GRIN lens element will produce negative spherical aberration too remarkable for correction. If the upper limit of the condition (1) or the lower limit of the condition (2) is exceed, the refractive power of medium will be too strong, thereby enlarging the Petzval's sum and making it impossible to keep the image surface flat.

By designing the GRIN lens element so as to satisfy these conditions, it is possible to correct spherical aberration sufficiently even when the most image side surface of the second lens component is convex toward the object side. When this surface is designed so as to be convex toward the object side, the offaxial ray has a smaller angle of incidence on this surface, thereby making it possible to correct the offaxial aberrations. That is to say, the present invention makes it possible to correct the spherical aberration and the offaxial aberrations, especially coma, at the same time in the imaging lens system.

It is more desirable for correcting the aberrations in the imaging lens system according to the present invention to design the second lens component so as to satisfy the following conditions (3) and (4):

$$0.2 < r_{0(2)}/f < 1.2 \quad (3)$$

$$0.35 < r_{1(2)}/r_{0(2)} < 0.95 \quad (4)$$

wherein the reference symbol $r_{0(2)}$ and $r_{1(2)}$ represent the radii of curvature on the most object side surface and the most image side surface respectively of the second lens component.

If the lower limit of the condition (3) is exceeded, the second lens component will have a too small radius of curvature on the most object side surface thereof, whereby the spherical aberration cannot be corrected sufficiently only by the GRIN lens element arranged in the third lens component. If the upper limit of the condition (3) is exceeded, the second lens component will have too large a radius of curvature on the most object side surface thereof, thereby making it impossible to correct the offaxial aberrations, especially coma.

If the lower limit of the condition (4) is exceeded, the second lens component will have too strong a negative refractive power, thereby making it impossible to correct the offaxial aberrations, especially coma. If the upper limit of the condition (4) is exceeded, the second lens component will have a weakened negative refractive power, thereby making it impossible to correct the spherical aberration sufficiently only by the GRIN lens element arranged in the third lens component.

DETAILED DESCRIPTION OF THE PREFERRED EMBODIMENTS

Now, the present invention will be described more detailed below with reference to the preferred Embodiments illustrated in the accompanying drawings and given in the form of the following numerical data:

Embodiment 1
f = 50 mm, F/2.0, 2ω = 46.8°

-continued

| | | | |
|---|---|---|---|
| $r_1 = 28.7637$ | | | |
| | $d_1 = 3.6752$ | $n_1 = 1.77250$ | $\nu_1 = 49.66$ |
| $r_2 = 123.2553$ | | | |
| | $d_2 = 0.1200$ | | |
| $r_3 = 24.6616$ | | | |
| | $d_3 = 3.5143$ | $n_2 = 1.84666$ | $\nu_2 = 23.78$ |
| $r_4 = 18.4892$ | | | |
| | $d_4 = 3.3000$ | | |
| $r_5 = \infty$ (stop) | | | |
| | $d_5 = 3.9103$ | | |
| $r_6 = -28.8164$ | | | |
| | $d_6 = 2.0324$ | $n_3 = 1.80518$ | $\nu_3 = 25.43$ |
| $r_7 = 255.8104$ | | | |
| | $d_7 = 1.1824$ | | |
| $r_8 = -222.2085$ | | | |
| | $d_8 = 14.7767$ | $n_4$ (GRIN lens) | |
| $r_9 = -58.4287$ | | | |

GRIN lens

| | $N_0$ | $N_1$ | $N_2$ |
|---|---|---|---|
| d line | 1.74100 | $-0.93040 \times 10^{-3}$ | $-0.31461 \times 10^{-6}$ |
| C line | 1.73673 | $-0.92420 \times 10^{-3}$ | $-0.31251 \times 10^{-6}$ |
| F line | 1.75080 | $-0.94487 \times 10^{-3}$ | $-0.31950 \times 10^{-6}$ |

$N_{1(1)} \cdot f^2 = -2.326$, $F \cdot t/f = 0.591$
$r_{0(2)}/f = 0.493$, $r_{1(2)}/r_{0(2)} = 0.750$

Embodiment 2
$f = 50$ mm, F/1.8, $2\omega = 46.4°$

| | | | |
|---|---|---|---|
| $r_1 = 26.0686$ | | | |
| | $d_1 = 4.1000$ | $n_1 = 1.77250$ | $\nu_1 = 49.66$ |
| $r_2 = 138.3484$ | | | |
| | $d_2 = 0.1200$ | | |
| $r_3 = 24.5799$ | | | |
| | $d_3 = 2.9061$ | $n_2$ (GRIN lens 1) | |
| $r_4 = 18.4997$ | | | |
| | $d_4 = 3.8000$ | | |
| $r_5 = \infty$ (stop) | | | |
| | $d_5 = 3.3519$ | | |
| $r_6 = -28.4450$ | | | |
| | $d_6 = 1.9304$ | $n_3 = 1.80518$ | $\nu_3 = 25.43$ |
| $r_7 = 258.8246$ | | | |
| | $d_7 = 1.1824$ | | |
| $r_8 = -91.4787$ | | | |
| | $d_8 = 12.2516$ | $n_4$ (GRIN lens 2) | |
| $r_9 = -52.1877$ | | | |

| | $N_0$ | $N_1$ | $N_2$ |
|---|---|---|---|
| GRIN lens 1 | | | |
| d line | 1.78472 | $0.41051 \times 10^{-3}$ | $0.47921 \times 10^{-6}$ |
| C line | 1.77596 | $0.40491 \times 10^{-3}$ | $0.47268 \times 10^{-6}$ |
| F line | 1.80652 | $0.42357 \times 10^{-3}$ | $0.49446 \times 10^{-6}$ |
| GRIN lens 2 | | | |
| d line | 1.74100 | $-0.11815 \times 10^{-2}$ | $-0.42322 \times 10^{-6}$ |
| C line | 1.73673 | $-0.11737 \times 10^{-2}$ | $-0.42039 \times 10^{-6}$ |
| F line | 1.75080 | $-0.11999 \times 10^{-2}$ | $-0.42980 \times 10^{-6}$ |

$N_{1(1)} \cdot f^2 = -2.954$, $F \cdot t/f = 0.441$
$r_{0(2)}/f = 0.492$, $r_{1(2)}/r_{0(2)} = 0.753$
$N_{1(2)} \cdot f^2 = 1.026$

Embodiment 3
$f = 50$ mm, F/1.8, $2\omega = 47.4°$

| | | | |
|---|---|---|---|
| $r_1 = 24.2442$ | | | |
| | $d_1 = 3.6190$ | $n_1 = 1.77250$ | $\nu_1 = 49.66$ |
| $r_2 = 63.3310$ | | | |
| | $d_2 = 0.1200$ | | |
| $r_3 = 28.7877$ | | | |
| | $d_3 = 4.5537$ | $n_2$ (GRIN lens 1) | |
| $r_4 = 18.5304$ | | | |
| | $d_4 = 6.1619$ | | |
| $r_5 = -33.4071$ | | | |
| | $d_5 = 1.6588$ | $n_3 = 1.80518$ | $\nu_3 = 25.43$ |
| $r_6 = 2122.3857$ | | | |
| | $d_6 = 1.0888$ | | |
| $r_7 = -275.2555$ | | | |
| | $d_7 = 11.0325$ | $n_4$ (GRIN lens 2) | |
| $r_8 = -69.6115$ | | | |
| | $d_8 = 0.2005$ | | |
| $r_9 = \infty$ (stop) | | | |

| | $N_0$ | $N_1$ | $N_2$ |
|---|---|---|---|
| GRIN lens 1 | | | |
| d line | 1.78472 | $0.40132 \times 10^{-4}$ | $0.63260 \times 10^{-6}$ |
| C line | 1.77596 | $0.39585 \times 10^{-4}$ | $0.62397 \times 10^{-6}$ |
| F line | 1.80652 | $0.41409 \times 10^{-4}$ | $0.65272 \times 10^{-6}$ |
| GRIN lens 2 | | | |
| d line | 1.74100 | $-0.12564 \times 10^{-2}$ | $-0.53983 \times 10^{-6}$ |
| C line | 1.73673 | $-0.12480 \times 10^{-2}$ | $-0.53623 \times 10^{-6}$ |
| F line | 1.75080 | $-0.12759 \times 10^{-2}$ | $-0.54823 \times 10^{-6}$ |

$N_{1(1)} \cdot f^2 = -3.141$, $F \cdot t/f = 0.397$
$r_{0(2)}/f = 0.576$, $r_{1(2)}/r_{0(2)} = 0.644$
$N_{1(2)} \cdot f^2 = 1.100$

Embodiment 4
$f = 50$ mm, F/1.8, $2\omega = 47.4°$

| | | | |
|---|---|---|---|
| $r_1 = 24.5365$ | | | |
| | $d_1 = 3.6000$ | $n_1 = 1.77250$ | $\nu_1 = 49.66$ |
| $r_2 = 58.3226$ | | | |
| | $d_2 = 0.1200$ | | |
| $r_3 = 25.8685$ | | | |
| | $d_3 = 4.1247$ | $n_2 = 1.80518$ | $\nu_2 = 25.43$ |
| $r_4 = 18.5546$ (aspherical surface) | | | |
| | $d_4 = 6.4334$ | | |
| $r_5 = -33.5683$ | | | |
| | $d_5 = 1.5088$ | $n_3 = 1.80518$ | $\nu_3 = 25.43$ |
| $r_6 = 107.5620$ | | | |
| | $d_6 = 1.0730$ | | |
| $r_7 = 672.1241$ | | | |
| | $d_7 = 10.8926$ | $n_4$ (GRIN lens) | |
| $r_8 = -71.6576$ | | | |
| | $d_8 = 0.2005$ | | |
| $r_9 = \infty$ (stop) | | | |

GRIN lens

| | $N_0$ | $N_1$ | $N_2$ |
|---|---|---|---|
| d line | 1.74100 | $-0.13378 \times 10^{-2}$ | $-0.77545 \times 10^{-6}$ |
| C line | 1.73673 | $-0.13289 \times 10^{-2}$ | $-0.77028 \times 10^{-6}$ |
| F line | 1.75080 | $-0.13586 \times 10^{-2}$ | $-0.78751 \times 10^{-6}$ | aspherical surface coefficient
$P = 1.0000$, $A_4 = 0.29246 \times 10^{-5}$
$A_6 = 0.74303 \times 10^{-8}$, $A_8 = -0.54336 \times 10^{-10}$
$N_{1(1)} \cdot f^2 = -3.345$, $F \cdot t/f = 0.392$
$r_{0(2)}/f = 0.517$, $r_{1(2)}/r_{0(2)} = 0.717$

Embodiment 5
$f = 50$ mm, F/1.8, $2\omega = 47.4°$

| | | | |
|---|---|---|---|
| $r_1 = 22.4987$ | | | |
| | $d_1 = 3.7262$ | $n_1 = 1.77250$ | $\nu_1 = 49.66$ |
| $r_2 = 53.5990$ | | | |
| | $d_2 = 0.1200$ | | |
| $r_3 = 30.5639$ | | | |
| | $d_3 = 4.7253$ | $n_2$ (GRIN lens 1) | |
| $r_4 = 18.2815$ | | | |
| | $d_4 = 6.7966$ | | |
| $r_5 = -29.8273$ | | | |
| | $d_5 = 1.6811$ | $n_3 = 1.80518$ | $\nu_3 = 25.43$ |
| $r_6 = -113.0930$ | | | |
| | $d_6 = 11.0474$ | $n_4$ (GRIN lens 2) | |
| $r_7 = -73.2058$ | | | |
| | $d_7 = 0.2005$ | | |
| $r_8 = \infty$ (stop) | | | |

| | $N_0$ | $N_1$ | $N_2$ |
|---|---|---|---|
| GRIN lens 1 | | | |
| d line | 1.78472 | $0.14046 \times 10^{-3}$ | $0.75949 \times 10^{-6}$ |
| C line | 1.77596 | $0.13855 \times 10^{-3}$ | $0.74913 \times 10^{-6}$ |
| F line | 1.80652 | $0.14493 \times 10^{-3}$ | $0.78366 \times 10^{-6}$ |
| GRIN lens 2 | | | |
| d line | 1.74100 | $-0.13699 \times 10^{-2}$ | $-0.28791 \times 10^{-6}$ |

-continued

| C line | 1.73673 | $-0.13608 \times 10^{-2}$ | $-0.28599 \times 10^{-6}$ |
| F line | 1.75080 | $-0.13912 \times 10^{-2}$ | $-0.29238 \times 10^{-6}$ |

$N_{1(1)} \cdot f^2 = -3.425$, $F \cdot t/f = 0.398$
$r_{0(2)}/f = 0.611$, $r_{1(2)}/r_{0(2)} = 0.598$
$N_{1(2)} \cdot f^2 = 0.351$ Embodiment 6
f = 50 mm, F/1.6, 2ω = 47.4°

| $r_1 = 24.1289$ | | | |
| | $d_1 = 4.8000$ | $n_1 = 1.77250$ | $v_1 = 49.66$ |
| $r_2 = 58.3825$ | | | |
| | $d_2 = 0.1200$ | | |
| $r_3 = 27.2800$ | | | |
| | $d_3 = 3.2988$ | $n_2$ (GRIN lens 1) | |
| $r_4 = 18.7938$ | | | |
| | $d_4 = 7.8000$ | | |
| $r_5 = -31.5521$ | | | |
| | $d_5 = 1.5238$ | $n_3 = 1.80518$ | $v_3 = 25.43$ |
| $r_6 = -569.0569$ | | | |
| | $d_6 = 1.0888$ | | |
| $r_7 = -160.3846$ | | | |
| | $d_7 = 10.0667$ | $n_4$ (GRIN lens 2) | |
| $r_8 = -72.7176$ | | | |
| | $d_8 = 0.2005$ | | |
| $r_9 = \infty$ (stop) | | | |

| | $N_0$ | $N_1$ | $N_2$ |
|---|---|---|---|
| GRIN lens 1 | | | |
| d line | 1.78472 | $0.17130 \times 10^{-3}$ | $0.75028 \times 10^{-6}$ |
| C line | 1.77596 | $0.16897 \times 10^{-3}$ | $0.74004 \times 10^{-6}$ |
| F line | 1.80652 | $0.17675 \times 10^{-3}$ | $0.77415 \times 10^{-6}$ |
| GRIN lens 2 | | | |
| d line | 1.74100 | $-0.14947 \times 10^{-2}$ | $-0.50868 \times 10^{-6}$ |
| C line | 1.73673 | $-0.14847 \times 10^{-2}$ | $-0.50529 \times 10^{-6}$ |
| F line | 1.75080 | $-0.15179 \times 10^{-2}$ | $-0.51660 \times 10^{-6}$ |

$N_{1(1)} \cdot f^2 = -3.737$, $F \cdot t/f = 0.322$
$r_{0(2)}/f = 0.546$, $r_{1(2)}/r_{0(2)} = 0.689$
$N_{1(2)} \cdot f^2 = 0.428$ Embodiment 7
f = 50 mm, F/2.0, 2ω = 47.0°

| $r_1 = 19.4902$ | | | |
| | $d_1 = 5.1000$ | $n_1 = 1.77250$ | $v_1 = 49.66$ |
| $r_2 = 113.9112$ | | | |
| | $d_2 = 0.1200$ | | |
| $r_3 = 39.2526$ | | | |
| | $d_3 = 1.5752$ | $n_2$ (GRIN lens 1) | |
| $r_4 = 17.4149$ | | | |
| | $d_4 = 6.0000$ | | |
| $r_5 = -24.7166$ | | | |
| | $d_5 = 15.1871$ | $n_3$ (GRIN lens 2) | |
| $r_6 = -99.1535$ | | | |
| | $d_6 = 1.1800$ | | |
| $r_7 = \infty$ (stop) | | | |

| | $N_0$ | $N_1$ | $N_2$ |
|---|---|---|---|
| GRIN lens 1 | | | |
| d line | 1.78472 | $0.56978 \times 10^{-3}$ | $0.11636 \times 10^{-5}$ |
| C line | 1.77596 | $0.56266 \times 10^{-3}$ | $0.11490 \times 10^{-5}$ |
| F line | 1.80652 | $0.58640 \times 10^{-3}$ | $0.11975 \times 10^{-5}$ |
| GRIN lens 2 | | | |
| d line | 1.74100 | $-0.10765 \times 10^{-2}$ | $0.67009 \times 10^{-6}$ |
| C line | 1.73673 | $-0.10701 \times 10^{-2}$ | $0.66607 \times 10^{-6}$ |
| F line | 1.75080 | $-0.10916 \times 10^{-2}$ | $0.67947 \times 10^{-6}$ |

$N_{1(1)} \cdot f^2 = -2.691$, $F \cdot t/f = 0.607$
$r_{0(2)}/f = 0.785$, $r_{1(2)}/r_{0(2)} = 0.444$
$N_{1(2)} \cdot f^2 = 1.424$ wherein the reference symbols $r_1, r_2,...$ represent the radii of curvature on the surfaces of the respective lens elements, the reference symbols $d_1, d_2,...$ designate the thicknesses of the respective lens elements and the airspaces reserebetween, the reference symbols $n_1, n_2,...$ denote the refractive indices of the respective lens elements, and the reference symbols $v_1, v_2,...$ represent the Abbe's numbers of the respective lens elements.

Figure 1:
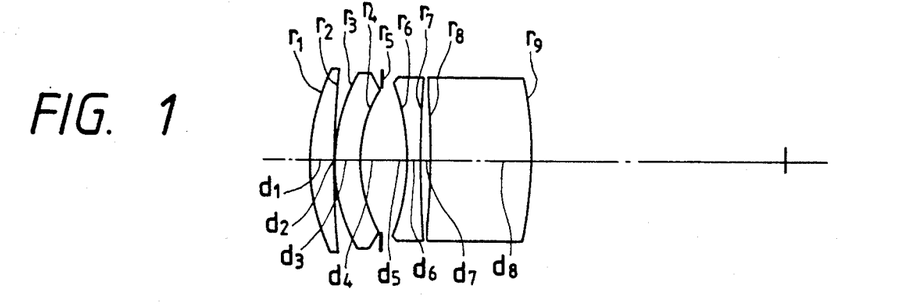
FIG. 1 through FIG. 7 show sectional views illustrating compositions of Embodiments 1 through 7 respectively of the imaging lens system according to the present invention.

The Embodiment 1 has the composition illustrated in FIG. 1 wherein the imaging lens system according to the present invention comprises, in the order from the object side, a first lens component consisting of a single positive lens element, a second lens component consisting of a single negative lens element, an aperture stop, and a third lens component consisting of a negative lens element and a positive lens element. The positive lens element arranged in the third lens component is designed as a GRIN lens element which satisfies the conditions (1) and (2). Further, the second lens component is designed so as to satisfy the conditions (3) and (4).

The Embodiment 1 is composed of the lens elements in a number of four which is the same as that of the lens elements used in the Tessar type lens system, but has an aperture ratio of F/2, favorably corrected spherical aberration and coma, a Petzval's sum corrected by using the GRIN lens element, and an image surface kept flat.

Figure 2:
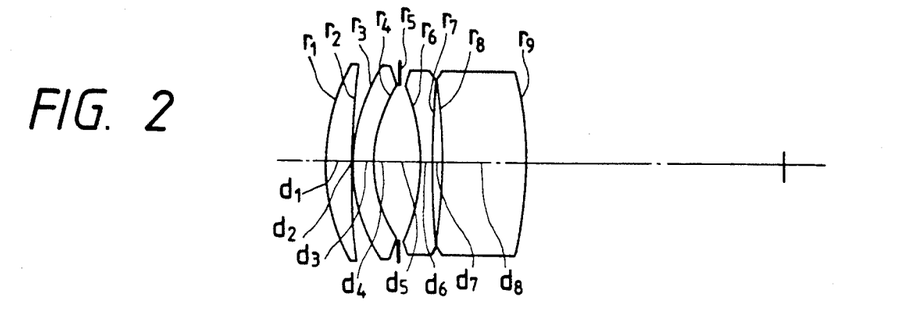

The Embodiment 2 has the composition illustrated in FIG. 2 wherein the imaging lens system according to the present invention comprises, in the order from the object side, a first lens component consisting of a single positive lens element, a second lens component consisting of a single negative lens element, an aperture stop, and a third lens component consisting of a negative lens element and a positive lens element. The positive lens element arranged in the third lens component is designed as a GRIN lens element satisfying the conditions (1) and (2), whereas the second lens component is designed so as to satisfy the conditions (3) and (4).

The Embodiment 2 uses, as the second lens component thereof, a radial GRIN lens element which satisfies the following condition (5):

$$0.05 < N_{1(2)} \cdot f^2 < 3.0 \qquad (5)$$

wherein the reference symbol $N_{1(2)}$ represents the refractive index distribution coefficient of the second order of the radial GRIN lens element used as the second lens component.

If the lower limit of the condition (5) is exceeded, it will be obliged, for obtaining the negative refractive power required for the second lens component, to design the object side surface of the second lens component as a surface concave toward the object side, which will undesirably produce coma in an increased amount. If the upper limit of the condition (5) is exceeded, the radial GRIN lens element used as the second lens component will have too strong a negative refractive power and produce remarkable positive spherical aberration by the medium thereof, thereby overcorrecting the spherical aberration in the imaging lens system as a whole.

Owing to the composition described above, the Embodiment 2 is designed as an imaging lens system composed of four lens elements and having a high aperture ratio of F/1.8.

Figure 3:
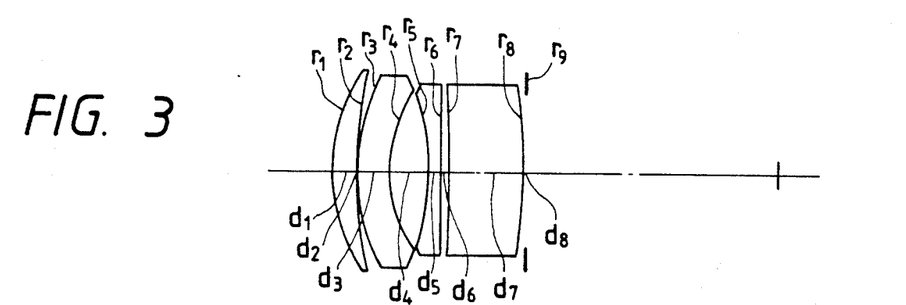

The Embodiment 3 has the composition shown in FIG. 3 wherein the imaging lens system according to the present invention comprises, in the order from the object side, a first lens component consisting of a single positive lens element, a second lens component consisting of a single negative lens element, a third lens component consisting of a negative lens element and a positive lens element, and an aperture stop. The positive lens element arranged in the third lens component is designed as a GRIN lens element satisfying the conditions (1) and (2). Further, the second lens component is designed so as to satisfy not only the conditions (3) and (4) but also the condition (5).

In a lens system wherein an aperture stop is arranged after all the lens components thereof, it is rather difficult to correct the offaxial aberrations since the lens components are arranged asymmetrically with regard to the aperture stop. This difficulty becomes especially remarkable in a case where it is desired to obtain a small F number of the lens system or enhance aperture ratio thereof.

The Embodiment 3 uses the radial GRIN lens element as the second lens component thereof, as in the case of the Embodiment 2, thereby having a high aperture ratio of F/1.8 regardless of the aperture stop arranged after the lens components and favorably corrected offaxial aberrations.

Figure 4:
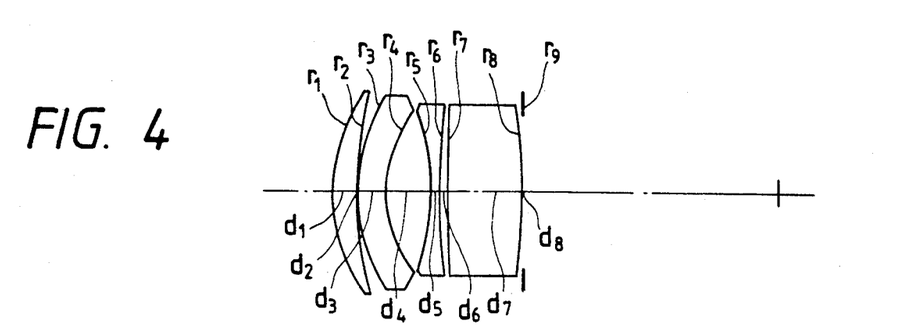

The Embodiment 4 has the composition illustrated in FIG. 4 wherein the imaging lens system according to the present invention comprises, in the order from the object side, a first lens component consisting of a single positive lens element, a second lens component consisting of a single negative lens element, a third lens component consisting of a negative lens element and a positive lens element, and an aperture stop.

In the Embodiment 4 also, the positive lens element arranged in the third lens component is designed as a GRIN lens element satisfying the conditions (1) and (2), and serving for correcting spherical aberration, whereas the second lens component is designed so as to satisfy the conditions (3) and (4), and the most image side surface of the second lens component is designed as an aspherical surface having refractive power strengthened as the portions thereof are farther from the optical axis (as rays are higher on the surface).

When the intersection between the lens surface and the optical axis is taken as the origin, the direction along the optical axis is taken as the x axis and the direction perpendicular to the optical axis is taken as the y axis, the shape of the aspherical surface is expressed by the following formula:

$$x = \frac{y^2/r}{1 + \sqrt{1 - p(y/r)^2}} + \sum_{i=2}^{n} A_{2i} y^{2i}$$

wherein the reference symbol r represents radius of curvature of the reference sphere of said aspherical surface, the reference symbol p designates the conical constant, and the reference symbol $A_{2i}$ denotes the aspherical surface coefficient.

The above-mentioned aspherical surface is used mainly for correcting spherical aberration and Petzval's sum. Speaking more concretely, this aspherical surface produces positive spherical aberration for cancelling the negative spherical aberration produced by the medium of the GRIN lens element arranged in the third lens component, thereby correcting spherical aberration favorably in the imaging lens system.

The Embodiment 4 is also designed as an imaging lens system having a high aperture ratio of F/1.8.

Figure 5:
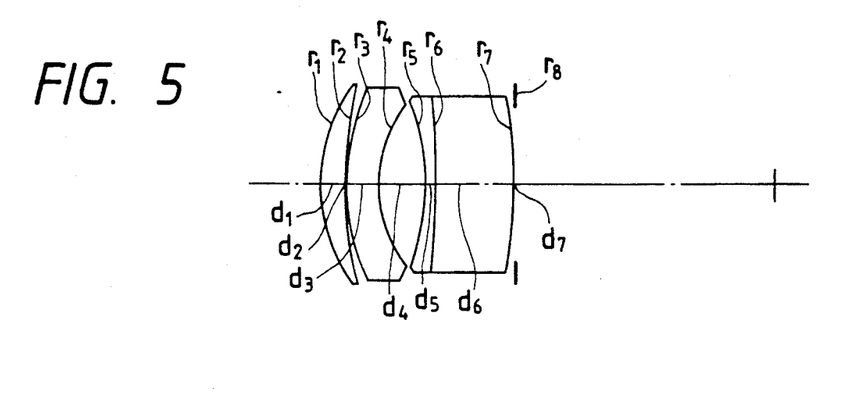

The Embodiment 5 has the composition illustrated in FIG. 5 wherein the imaging lens system according to the present invention comprises, in the order from the object side, a first lens component consisting of a single positive lens element, a second lens component consisting of a single negative lens element, a third lens component designed as a cemented doublet consisting of a negative lens element and a positive lens element, and an aperture stop. The positive lens element arranged in the third lens component is designed as a GRIN lens element satisfying the conditions (1) and (2), whereas the second lens component is designed as another GRIN lens element which satisfies not only the conditions (3) and (4) but also the condition (5).

The Embodiment 5 has the composition which is similar to that of the Embodiment 3, but is different therefrom in that the third lens component of the Embodiment 5 is designed as the cemented doublet. This cemented doublet serves for further reducing Petzval's sum and lowering susceptibility to eccentricity of the lens elements.

Figure 6:
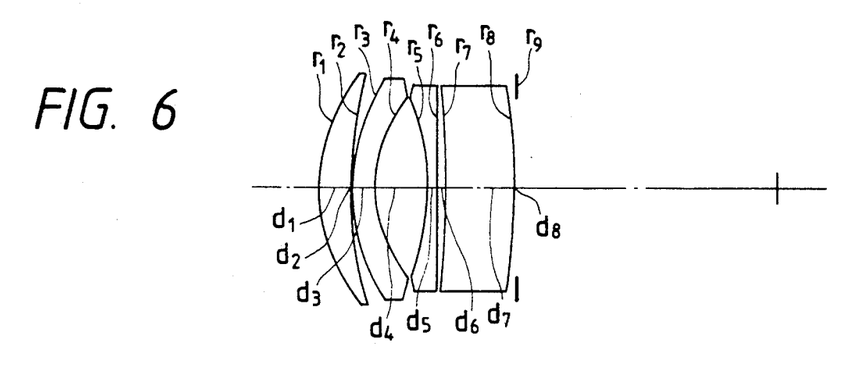

The Embodiment 6 has the composition shown in FIG. 6 wherein the imaging lens system according to the present invention comprises, in the order from the object side, a first lens component consisting of a single positive lens element, a second lens component consisting of a single negative lens element, a third lens component consisting of a negative lens element and a positive lens element, and an aperture stop. The positive lens element arranged in the third lens component is designed as a GRIN lens element satisfying the conditions (1) and (2), whereas the second lens component is designed as a GRIN lens element which satisfies not only the conditions (3) and (4) but also the condition (5).

The Embodiment 6 has the composition similar to that of the Embodiment 3 wherein the aperture stop is arranged after all the lens components, but has a higher aperture ratio of F/1.6 without aggravating the offaxial aberrations.

Figure 7:
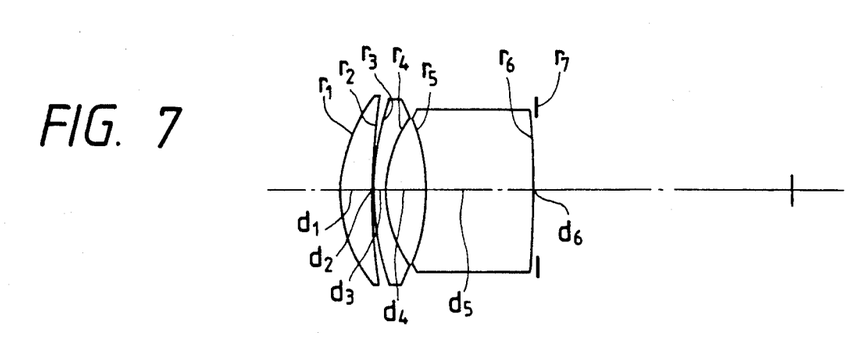
Figure 8:
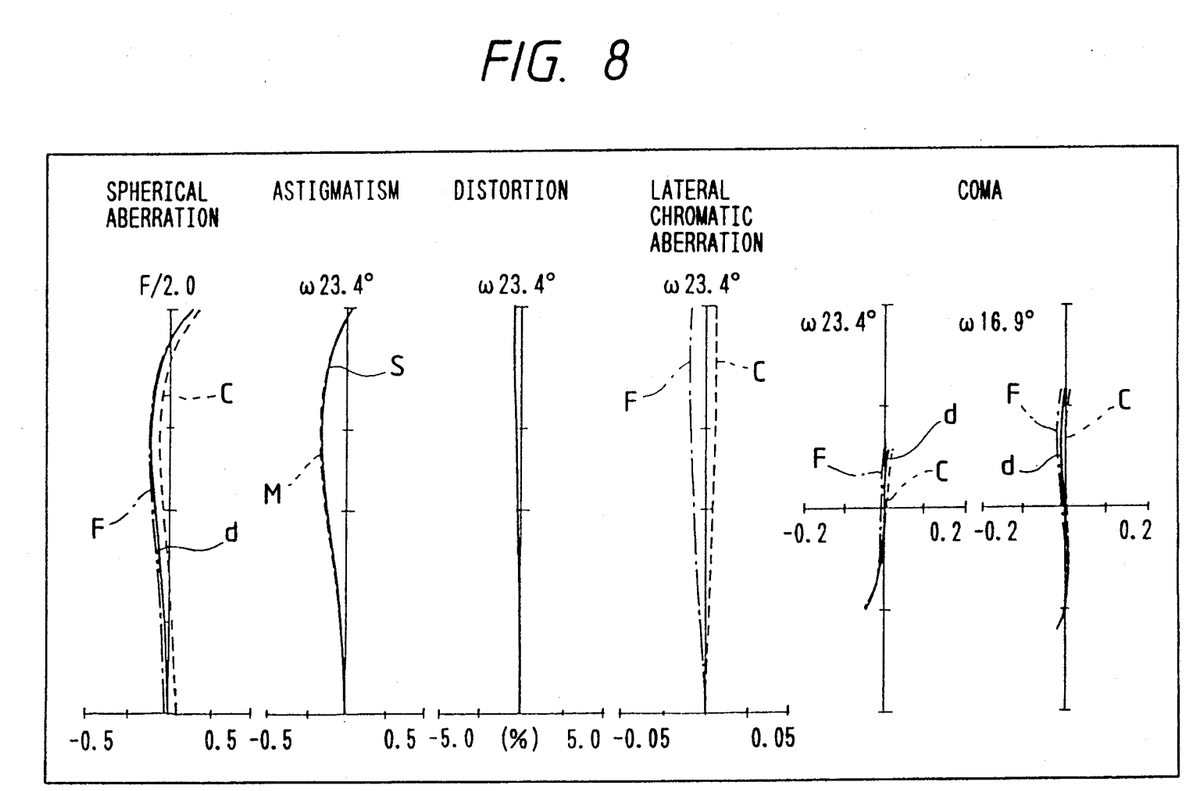
FIG. 8 through FIG. 14 show graphs illustrating aberration characteristics of the Embodiments 1 through respectively of the present invention in conditions where the imaging lens systems are focused on objects located at infinite distance.
Figure 9:
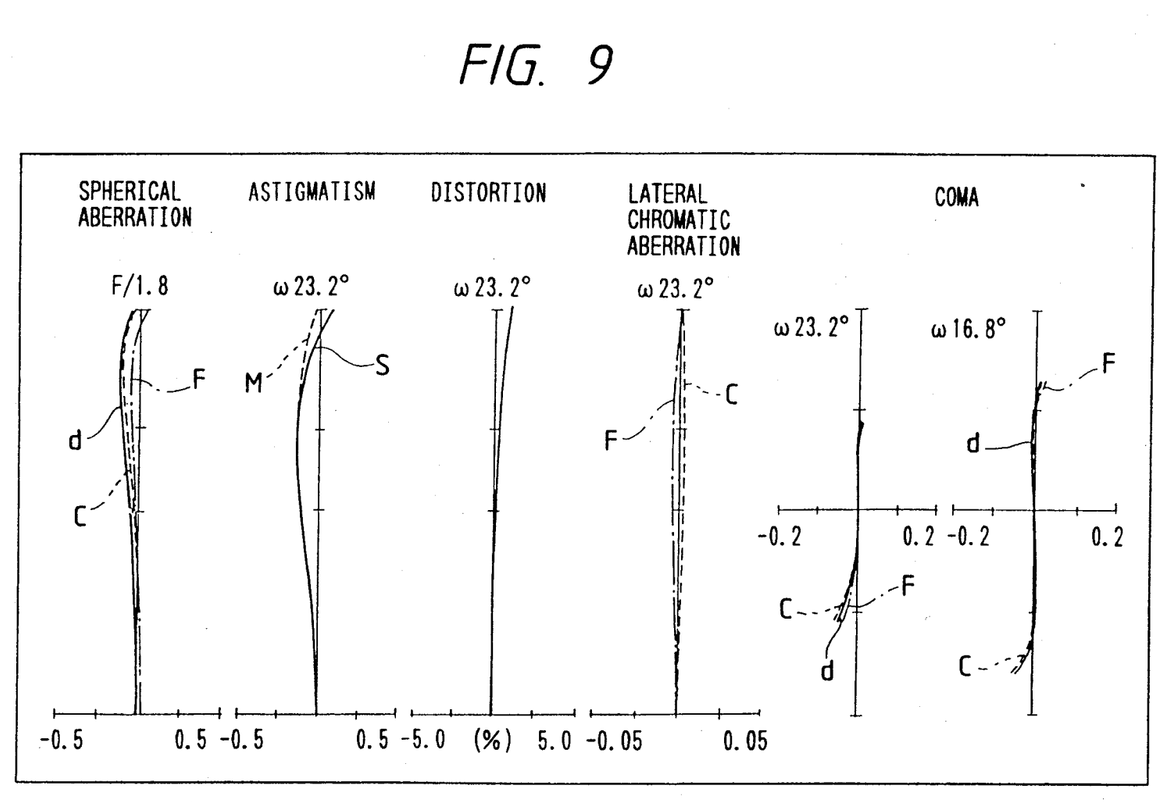
Figure 10:
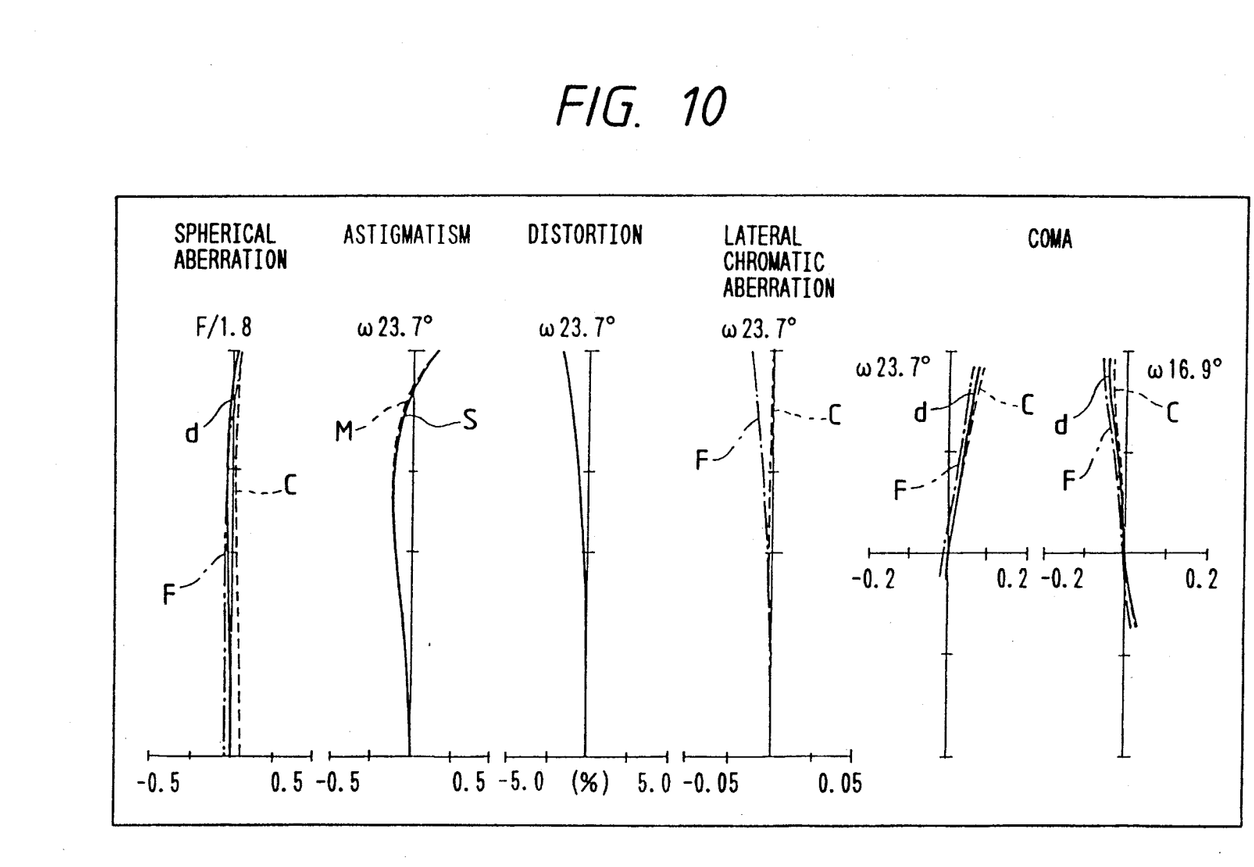
Figure 11:
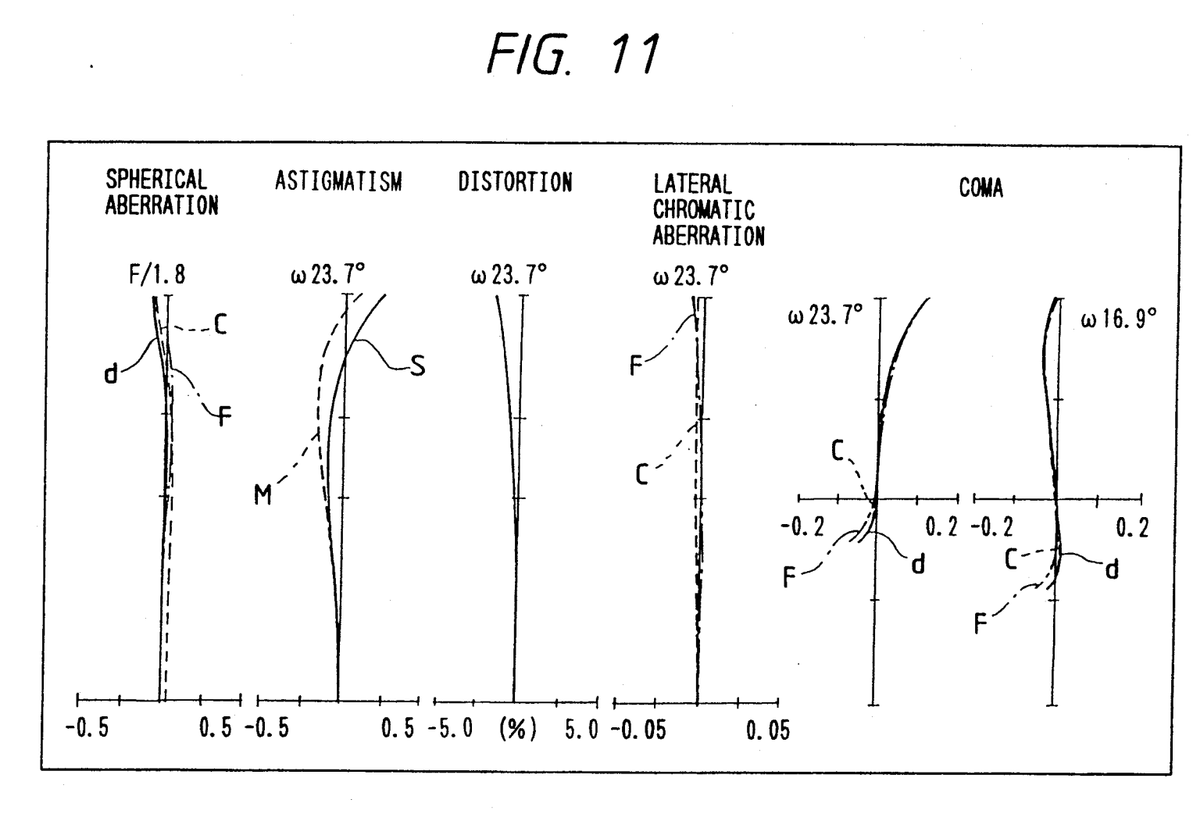
Figure 12:
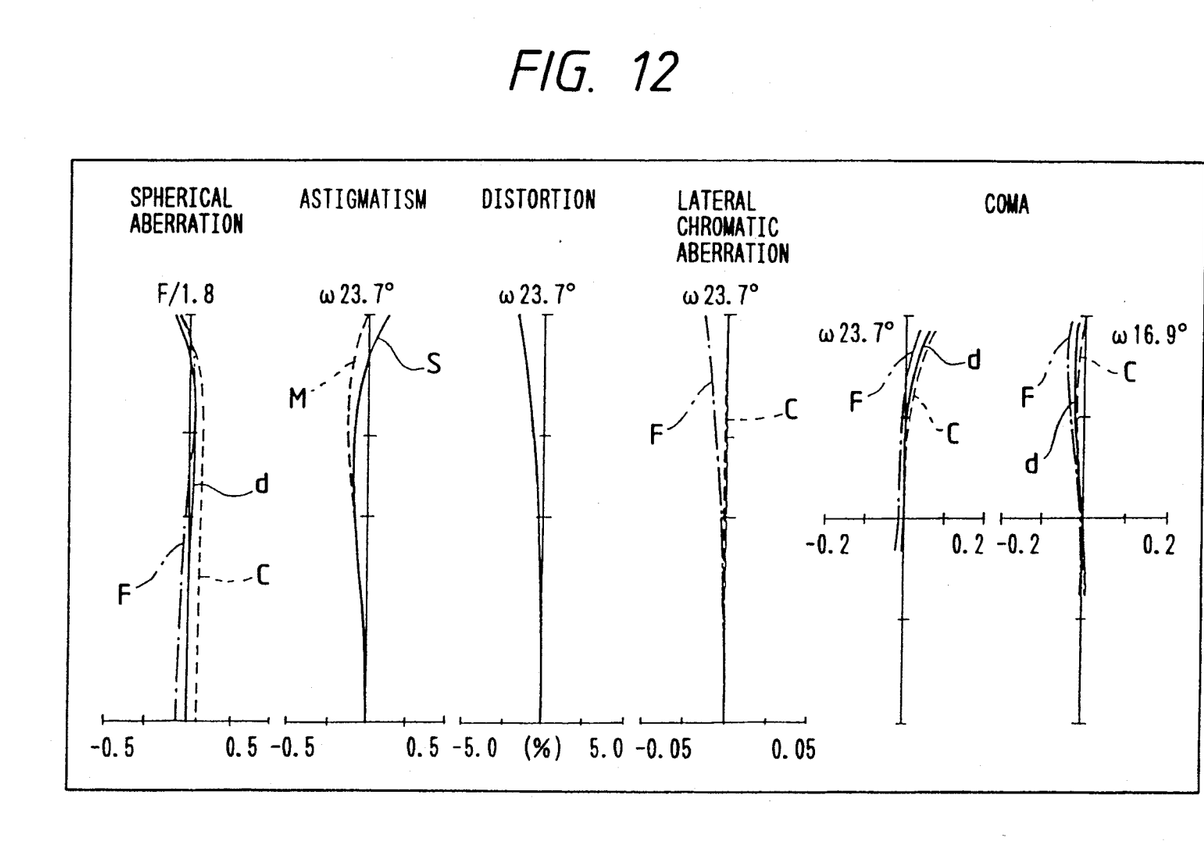
Figure 13:
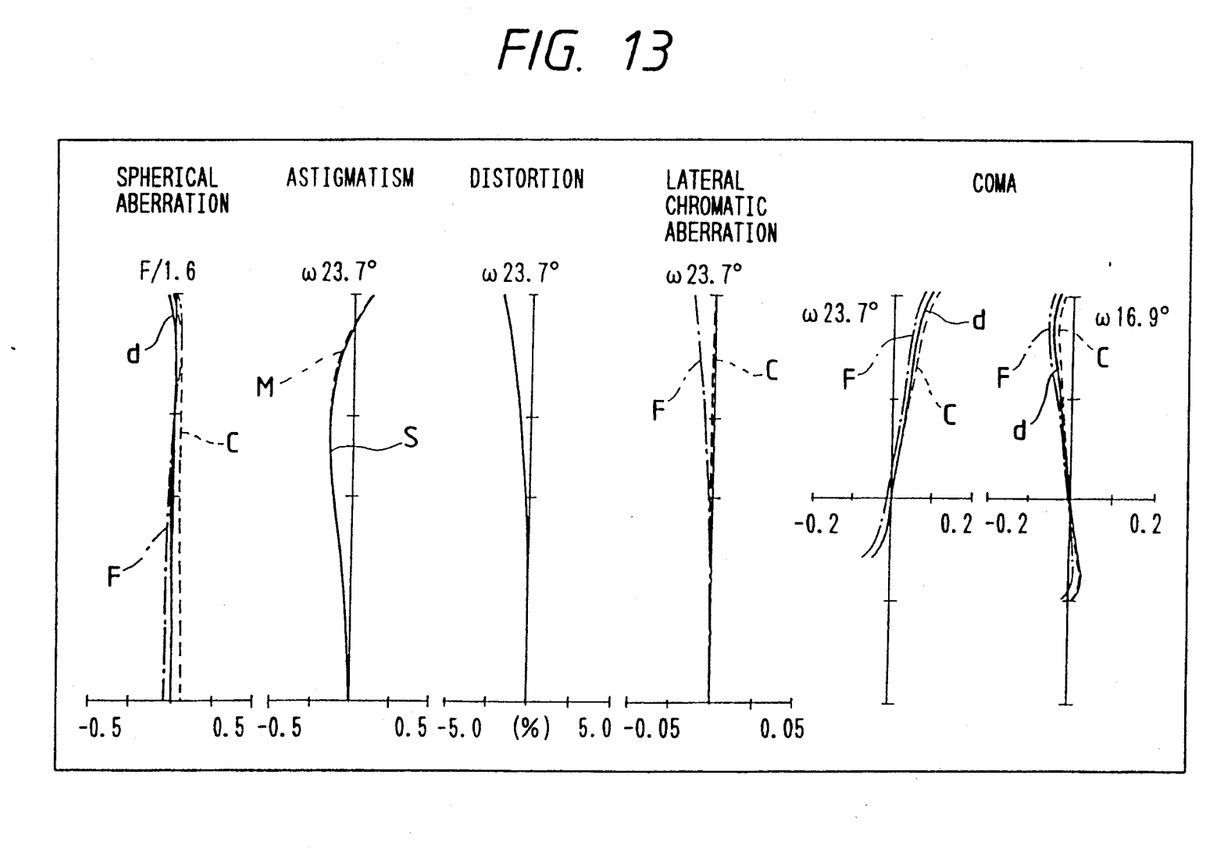
Figure 14:
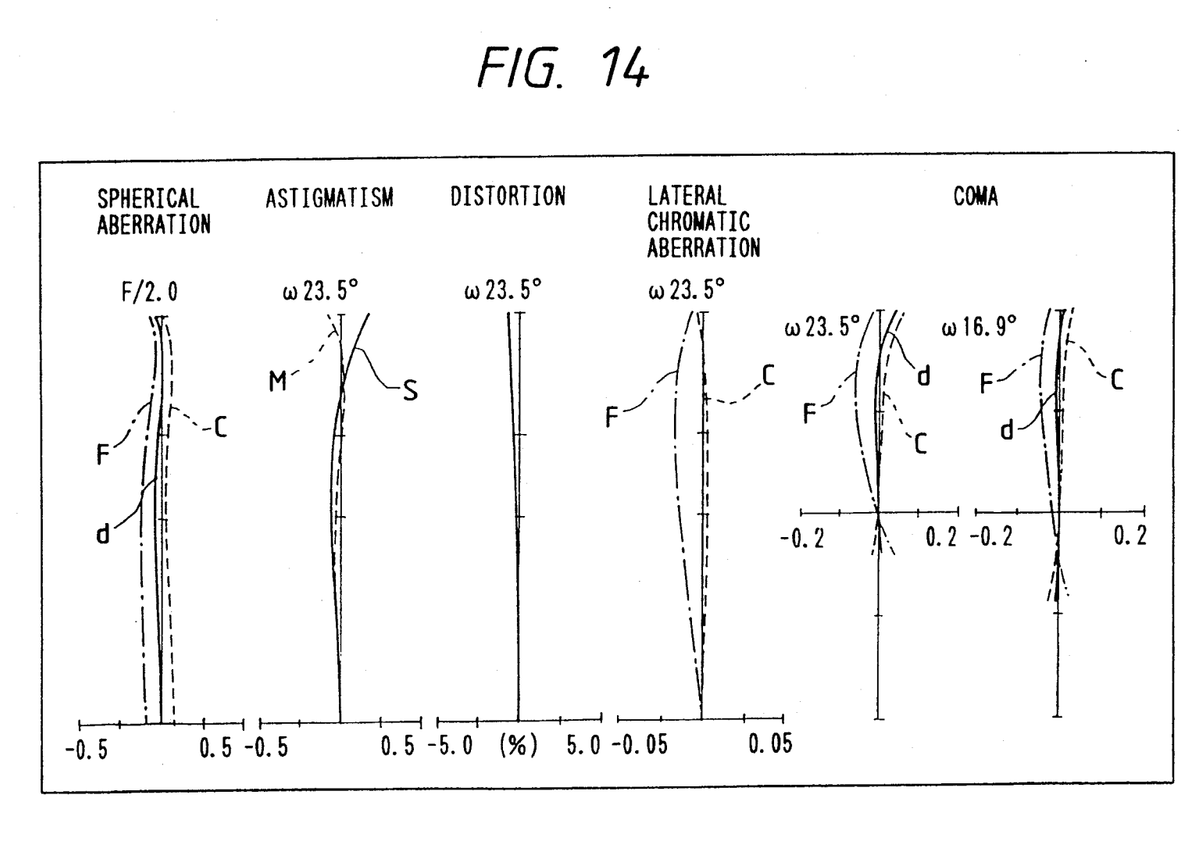

The Embodiment 7 has the composition illustrated in FIG. 7 wherein the imaging lens system according to the present invention comprises, in the order from the object side, a first lens component consisting of a single positive lens element, a second lens component consisting of a single negative lens element, a third lens component consisting of a lens element having a positive refractive power and an aperture stop. The third lens component is composed, as shown in FIG. 7, of a lens element having the shape of a negative lens element and designed as a GRIN lens element which satisfies the conditions (1) and (2), and has a positive total refractive power. Further, the second lens component is designed as another GRIN lens element which satisfies not only the conditions (3) and (4) but also the condition (5).

Though the Embodiment 7 is composed of the lens elements in a number as small as three, it has a high aperture ratio of F/2 and the offaxial aberrations corrected favorably by designing the second lens component so as to satisfy the conditions (3) and (4).

I claim:

1. An imaging lens system comprising, in the order from the object side;

a first lens component having a convex surface on the object side and a positive refractive power;

a second lens component having an object side surface and an image side surface that are both convex toward the object side, and a negative refractive power; and a third lens component, said third lens component comprising a positive lens element disposed on the most image side of the third lens component, said positive lens element having a convex surface on the image side, wherein said positive lens element of said third lens component is a graded refractive index lens element having a refractive index that varies in the radial direction, the refractive index of said graded refractive index lens system being expressed by the formula shown below, and said imaging optical system satisfying the following conditions (1) and (2):

$$n(r) = N_0 + N_1 r^2 + N_2 r^4 + \ldots$$

$$N_1 < 0 \tag{i}$$

$$-7.0 < N_{1(1)} \cdot f^2 < -0.5 \tag{1}$$

$$0.1 < F \cdot t/f < 1.5 \tag{2}$$

wherein the reference symbol $N_0$ represents the refractive index of said graded refractive index lens element as measured on an optical axis of the imaging lens system, the reference symbol r designates the distance as measured from the optical axis to a lens portion of interest in the radial direction, the reference symbol n(r) denotes the refractive index of a portion of the lens located at the distance r from the optical axis, the reference symbols $N_1$, $N_2$, $N_3$, ... represent the refractive index distribution coefficients of the second order, fourth order, sixth order, ..., the reference symbol f designates the focal length of the imaging lens system as a whole, the reference symbol t denotes he thickness of the graded refractive lens element as measured on the optical axis, the reference symbol F represents the F number of the imaging lens system and the reference symbol $N_{1(1)}$ designates the index distribution coefficient of the second order of said GRIN lens element.

2. An imaging lens system comprising, in the order from the object side:

a first lens component having a convex surface on the object side and a positive refractive power;

a second lens component having a concave surface on the image side and a negative refractive power; and a third lens component, said third lens component comprising a positive lens element disposed on the most image side of the third lens component, said positive lens element having a convex surface on the image side, and being a graded refractive index lens element having refractive index that varies in the radial direction as expressed by the formula shown below and satisfying the following conditions:

$$n(r) = N_0 + N_1 r^2 + N_2 r^4 + \ldots$$

$$N_1 < 0 \tag{i}$$

$$-7.0 < N_{1(10)} \cdot f^2 < -0.5 \tag{1}$$

$$0.1 < F \cdot t/f < 1.5 \tag{2}$$

wherein the reference symbol $N_0$ represents the refractive index of said grade refractive index lens element as measured on an optical axis of the imaging lens system, the reference symbol r designates the distance as measured from the optical axis to a lens portion of interest in the radial direction, the reference symbol n(r) denotes the refractive index of a portion of the lens located at the distance r from the optical axis, the reference symbols $N_1$, $N_2$, $N_3$, ... represent the refractive index distribution coefficients of the second order, fourth order, sixth order, ..., the reference symbol f designates a focal length of the imaging lens system as a whole, the reference symbol t denotes thickness of the graded refractive index lens element as measured on the optical axis, the reference symbol F represents a F number of the imaging lens system and the reference symbol $N_{1(1)}$ designates the index distribution coefficient of the second order of said graded refractive index lens element.

3. An imaging less system according to claim 1 or 2 satisfying the following conditions (3) and (4):

$$0.2 < r_{0(2)}/f < 1.2 \tag{3}$$

$$0.35 < r_{1(2)}/r_{0(2)} < 0.95 \tag{4}$$

wherein the reference symbols $r_{0(2)}$ and $r_{1(2)}$ represent the radii of curvature on the most object side surface and the most image side surface respectively of said second lens component.

4. An imaging lens system according to claim 3 wherein said second lens component is composed of a graded refractive index lens element having refractive index varying in the radial direction and designed so as to satisfy the following condition (5):

$$0.05 < N_{1(2)} \cdot f^2 < 3.0 \tag{5}$$

wherein the reference symbol $N_{1(2)}$ represents the refractive index distribution coefficient of the second order of said second lens component.

5. An imaging lens system according to claim 3 wherein said second lens component has an aspherical surface on its image side having negative refractive power strengthened as the surface portions are farther from the optical axis.

6. An imaging lens system according to claim 1 or 2 wherein said first lens component comprises a single positive meniscus lens element having a convex surface on the object side, said second lens component is composed of a single negative meniscus lens element having a convex surface on the object side, and said third lens component is composed of a negative lens element having a concave surface on the object side and a positive lens element.

7. An imaging lens system according to claim 1 or 2 wherein said first lens component comprises a single positive meniscus lens element having a convex surface on the object side, said second lens component is composed of a single negative meniscus lens element having a convex surface on the object side and said third lens component is composed of a single positive lens element.

8. An imaging lens system according to claim 1 or 2 wherein an aperture stop is disposed between said second lens component and said third lens component.

9. An imaging lens system according to claim 1 or 2 wherein an aperture stop is disposed on the image side of said third lens component.

10. An imaging lens system according to claim 3, wherein said first lens component consists of a single positive meniscus lens element having a convex surface on the object side, said second lens component consists of a single negative meniscus lens element having a convex surface on the object side, and said third lens component consists of a negative lens element having a concave surface on the object side and a positive lens element.

11. An imaging lens system according to claim 4 wherein said first lens component consists of a single positive meniscus lens element having a convex surface on the object side, said second lens component consists of a single negative meniscus lens element having a convex surface on the object side, and said third lens component consists of a negative lens element having a concave surface on the object side and a positive lens element.

12. An imaging lens system according to claim 3 wherein said first lens component consists of a single positive meniscus lens element having a convex surface on the object side, said second lens component consists of a single negative meniscus lens element having a convex surface on the object side and said third lens component consists of a single positive lens element.

13. An imaging lens system according to claim 4 wherein said first lens component consists of a single positive meniscus lens element having a convex surface on the object side, said second lens component consists of a single negative meniscus lens element having a convex surface on the object side and said third lens component consists of a single positive lens element.

14. An imaging lens system according to claim 3 wherein an aperture stop is disposed between said second lens component and said third lens component.

15. An imaging lens system according to claim 4 wherein an aperture stop is disposed between said send lens component and said third lens component.

16. An imaging lens system according to claim 3 wherein an aperture stop is disposed on the image side of said third lens component.

17. An imaging lens system according to claim 4 wherein an aperture stop is disposed on the image side of said third lens component.

* * * * *